US012783688B2

(12) United States Patent
Shpilyuck et al.

(10) Patent No.: US 12,783,688 B2
(45) Date of Patent: Nov. 3, 2026

(54) CHAOS TESTING PRIORITIZATION USING VULNERABILITY FACTORS

(71) Applicant: Dell Products, L.P., Round Rock, TX (US)

(72) Inventors: Boris Shpilyuck, Ashdod (IL); Hemant Ramesh Gaikwad, Pune (IN); Igor Dubrovsky, Beer Sheva (IL); Nisan Haimov, Beer Sheva (IL)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/980,730

(22) Filed: Dec. 13, 2024

(65) Prior Publication Data

US 2026/0170142 A1 Jun. 18, 2026

(51) Int. Cl.
*G06F 21/57* (2013.01)
*G06F 8/71* (2018.01)
*G06F 8/77* (2018.01)
*G06F 11/3668* (2025.01)

(52) U.S. Cl.
CPC .............. *G06F 21/577* (2013.01); *G06F 8/71* (2013.01); *G06F 8/77* (2013.01); *G06F 11/3688* (2013.01)

(58) Field of Classification Search
None
See application file for complete search history.

(56) References Cited

U.S. PATENT DOCUMENTS

2011/0191138 A1* 8/2011 Saraf .................. G06Q 10/0635 706/54
2018/0260207 A1* 9/2018 Dias de Assuncao .... G06F 8/65
2022/0342663 A1* 10/2022 Barkaee ..................... G06F 8/77
2024/0338456 A1* 10/2024 Madison, Jr. ......... G06F 21/577
2025/0053501 A1* 2/2025 Ayyadurai .......... G06F 11/3684
2025/0217127 A1* 7/2025 Hicks ........................ G06F 8/51

OTHER PUBLICATIONS

Kesim, D., van Hoorn, A., Frank, S. and Haussler, M., Oct. 2020. Identifying and prioritizing chaos experiments by using established risk analysis techniques. In 2020 IEEE 31st International Symposium on Software Reliability Engineering (ISSRE) (pp. 229-240). IEEE. (Year: 2020).*
Ramaswamy, Y., 2020. Resilience engineering in DevOps: Fault injection and chaos testing for distributed systems. NeuroQuantology, 18(12), pp. 337-347. (Year: 2020).*

* cited by examiner

*Primary Examiner* — Luu T Pham
*Assistant Examiner* — Edward X Long
(74) *Attorney, Agent, or Firm* — Amin, Turocy & Watson, LLP

(57) ABSTRACT

Architectures and techniques are described that can determine a vulnerability factor (VF) for a microservice (or another suitable executable instruction unit) of a microservice platform (or another suitable software system or platform). The VF can be indicative of an aggregate vulnerability score of the microservice. The VF can combine an engineering risk score, a code complexity score, and/or a historical record score, each of which can be configurably weighted. A list of the microservices ranked or ordered according to the VF can be used to prioritize chaos testing procedures.

20 Claims, 11 Drawing Sheets

CHAOS TESTING PRIORITIZATION USING VULNERABILITY FACTORS

BACKGROUND

Chaos testing refers to the discipline of experimenting on a software system in order to build confidence in the system's capability to withstand turbulent and unexpected conditions. Generally, chaos testing intentionally creates continuous, random or systematic failures in the software system, for instance, such as terminating a service instance frequently relied on by the software system, throttling the traffic to or from a particular service, or the like. Hence, chaos testing can effectively test the ability of said system to overcome such failures. After failure injection resulting from the chaos testing, the software system can be analyzed in order to understand the impact the chaos testing (e.g., intentional failures) had on the system.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
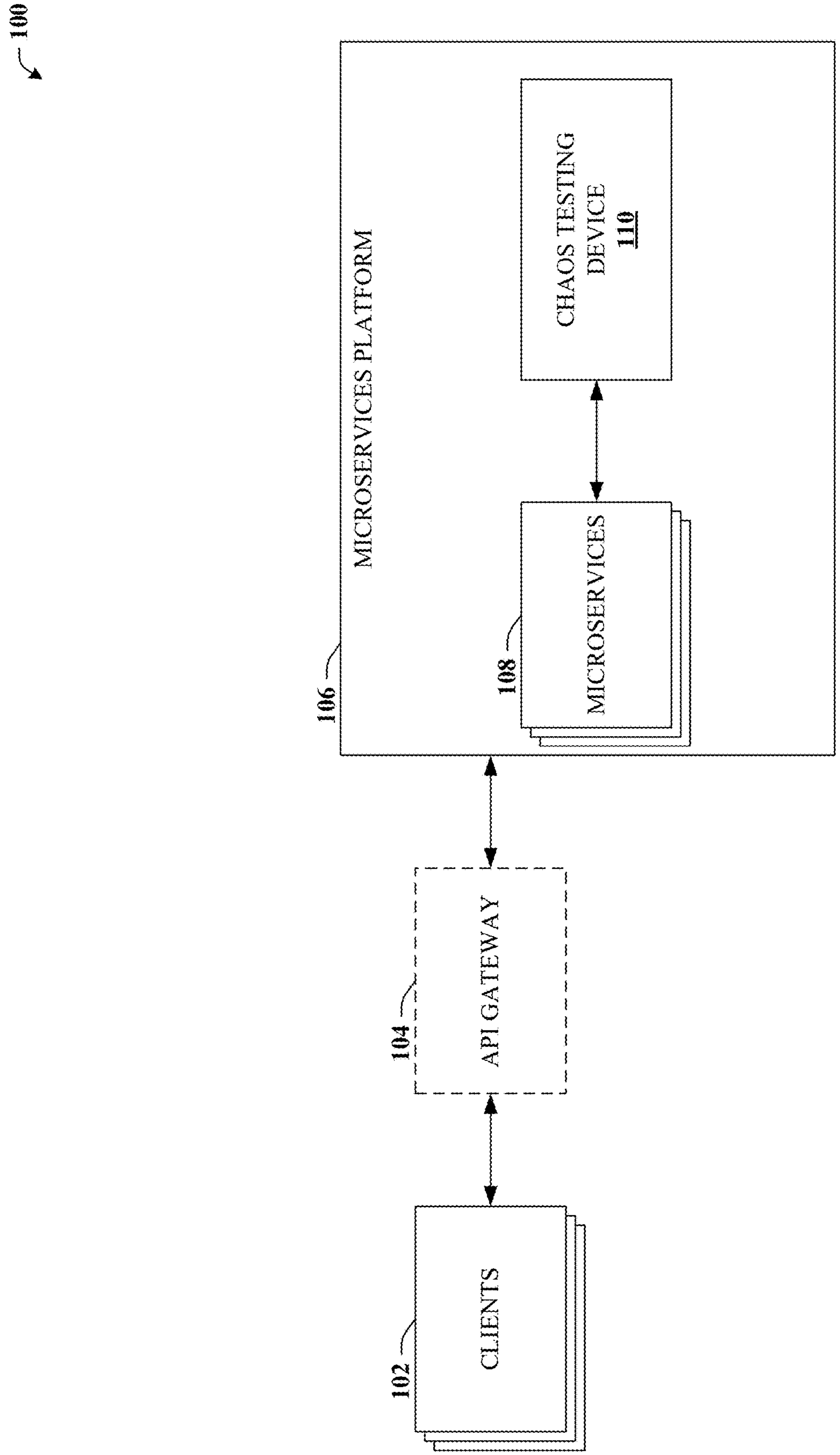
FIG. 1 depicts a schematic block diagram 100 illustrating certain functionality or operation of a microservices platform in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As noted in the Background section, chaos testing results can be analyzed in order to understand how the system responds to undesirable events such as certain components going down or certain resources becoming over utilized. Such analysis is a complex and time-consuming process, so a practical solution for chaos testing is to inject the failures into the subset of the most critical portions of the software system.

It is to be understood that chaos testing can be utilized for any type of software system, but as a representative example used for the remainder of this disclosure, chaos testing and other related elements are described in the context of a microservices platform, an example of which is illustrated in connection with FIG. 1. In other words, while microservices are used herein as a representative example, the disclosed techniques can be applied to any type of executable instruction unit such as a microservice, a module, an application, a software component, or a computational process.

A microservices platform can represent a software architecture and set of tools designed to support the development, deployment, and management of microservices-based applications. Microservices architecture(s) generally enable an approach to software development where applications are composed of loosely coupled, independently deployable services, each responsible for a specific business function. Microservices platforms can provide developers with the tools and infrastructure needed to build, deploy, and operate microservices-based applications at scale. The platform can help organizations embrace the principles of microservices architecture and leverage associated benefits, such as agility, scalability, and resilience, to deliver innovative and reliable software solutions.

To provide additional context, consider an example architecture associated with a microservices platform, illustrated in connection with FIG. 1. FIG. 1 depicts a schematic block diagram 100 illustrating certain functionality or operation of a microservices platform in accordance with certain embodiments of this disclosure.

Microservices platform 106 can have deployed thereon microservices 108. Microservices 108 can communicate with one another via well-defined application programming interfaces (APIs), such as representational state transfer (REST) APIs, also referred to as RESTful APIs. Each microservice 108 can represent a loosely coupled, independently deployable, self-contained service that serves a specific function or capability. Microservices 108 can differ from traditional monolithic applications due to this architectural design. For example, an application can make API calls to one or more microservices 108 instead of coding the function or capability into the application in a monolithic way. Hence, a given microservice 108 can provide a dedicated function or capability to many different applications or other microservices 108 in a more resilient and scalable manner.

For example, clients 102 that execute applications can make calls to microservices 108 of microservices platform 106. Optionally, any such communication can be via API gateway 104. API gateway 104 can be a server that acts as a single entry point for clients 102 to access multiple microservices 108. API gateway 104 can serve as a reverse proxy that routes requests from clients 102 to the appropriate microservices 108, abstracting away potential complexities of the underlying microservices architecture.

It is appreciated that in the context of this disclosure, microservices platform 106 can be any suitable platform that provides access to microservices 108. Such can be any suitable cloud-based services platform, a containerized workflow platform or container orchestration platform such as Kubernetes or another system or platform.

As indicated above, microservices platforms (e.g., microservices platform 106) can provide developers with the tools and infrastructure needed to build, deploy, and operate microservices-based applications at scale. In order to meet these goals, it can be important to monitor the health of microservices platform 106 as well as the operation of the microservices 108 deployed thereon, which can be provided at least in part by chaos testing device 110.

As explained, chaos testing device 110 can intentionally inject issues into microservices platform 106 in order to test how the system responds. After failure injection, the system can be analyzed in order to understand the impact the failure had on the system. However, in a typical microservices environment (e.g., microservices platform 106), the application might consist of hundreds or even thousands of the microservices 108. Because chaos testing relies on system resources it is not generally practical to do chaos testing for all microservices 108 that are deployed on microservices platform 106.

Rather, a more realistic approach is to apply chaos testing techniques to only a subset of microservices 108. Therefore, it becomes very challenging to decide on the subset of the most critical microservices (e.g., system stability-wise) that should undergo the chaos testing. In accordance with some embodiments of the disclosed techniques, the subset of microservices 108 selected to undergo chaos testing by identifying one or more microservices 108 that are the most vulnerable. To these and other related ends, a vulnerability factor can be determined by a vulnerability factor device.

This vulnerability factor can be calculated for each microservice 108. The vulnerability factor itself can be an aggregated metric that specifies how vulnerable each microservices 108 is. The certain embodiments, the vulnerability factor can be comprised of all or a portion of the following factors: a code complexity metric indicative of a complexity of the code for a given microservice 108, a developer profile metric for the developers and/or engineers who contributed to the codebase of the associated microservice 108, or a historical record of issues metric associated with the subject microservice 108. Hence, the vulnerability factor can be utilized for identification of the (potentially) most vulnerable microservices 108 and therefore, the subset of microservices 108 that are to undergo chaos testing, which is further detailed in connection with FIG. 2 and subsequent drawings.

It is to be appreciated that while chaos testing can be highly desired for identifying weaknesses and vulnerabilities in software platforms or systems, allocating excessive resources to chaos testing can affect resources, budgets and manpower. Therefore, there is a need for an approach that allows software platform providers to balance between those concerns. The disclosed techniques can be used to direct chaos testing in a more efficient manner. For example, by being able to perform chaos testing on the most vulnerable parts of the system as determined in this disclosure can provide a reasonable confidence in the resiliency of the system, while dedicating no more than a reasonable amount of resources for the chaos testing process.

Example Systems

Figure 2:
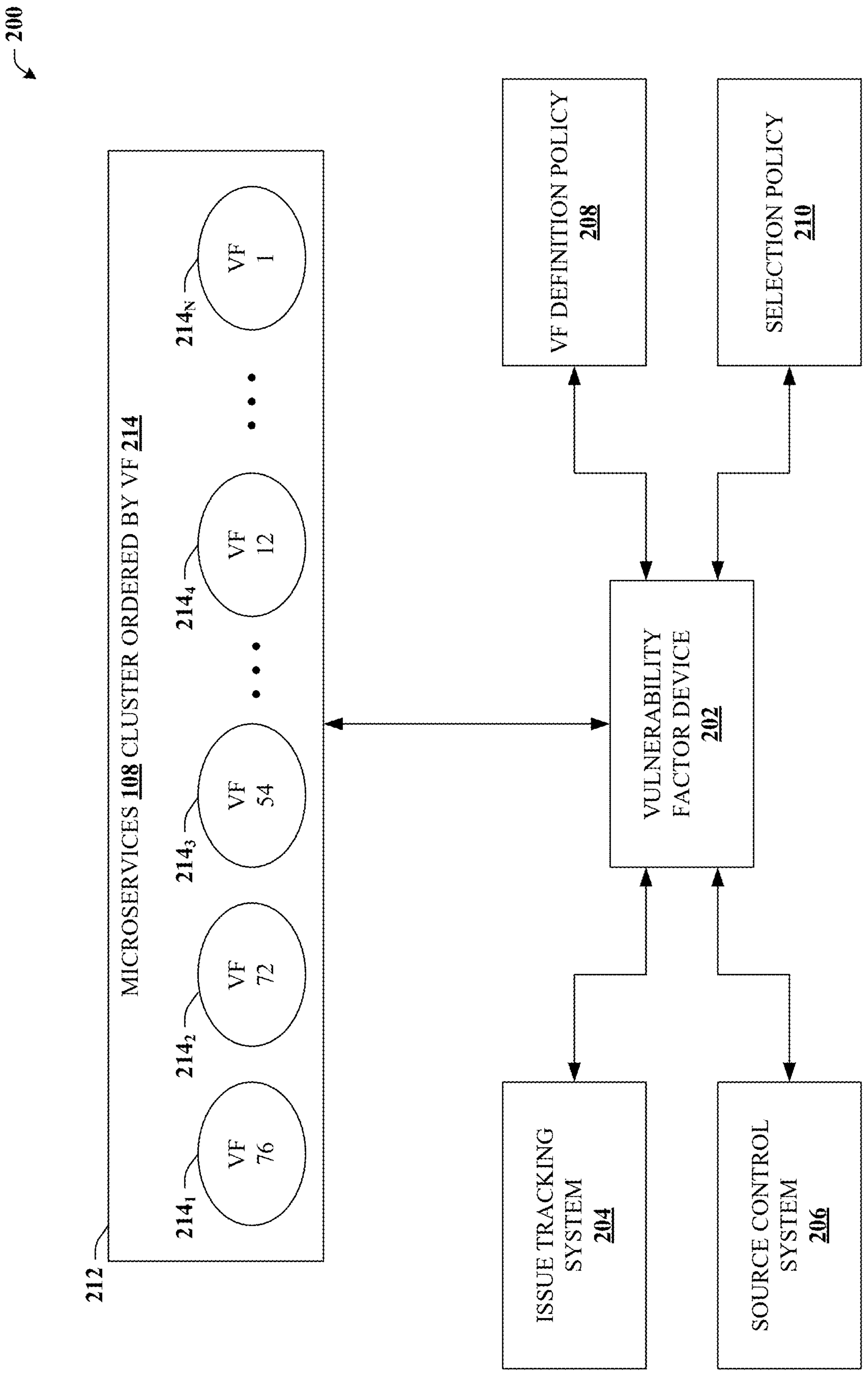
FIG. 2 depicts a schematic block diagram illustrating a vulnerability factor device that can determine a vulnerability factor for microservices of a microservices platform in accordance with certain embodiments of this disclosure.

Referring now to FIG. 2, a schematic block diagram 200 is depicted illustrating a vulnerability factor (VF) device 202 that can determine a VF 214 for microservices 108 of a microservices platform 106 in accordance with certain embodiments of this disclosure.

VF device 202 can be coupled to or comprise any of issue tracking system 204, source control system 206, VF definition policy 208, selection policy 210, or other suitable elements. Issue tracking system 204 can be configured to create, assign, and track issues, bugs, or tasks throughout a development lifecycle. Any such system can be used for the disclosed techniques, but as a representative example that is commonly used in the context of microservices, issue tracking system 204 can be, or can be similar to, Jira, a well-known software project management and collaboration platform that provides issue tracking.

Source control system 206 can be configured to allow software developers to create, store, manage, and share code. Any such system can be used for the disclosed techniques, but as a representative example that is commonly used in the context of microservices, source control system 206 can be, or can be similar to, GitHub, a well-known platform for software developers that provides, e.g., distributed version control, access control, bug tracking, software feature requests, task management, continuous integration, and so on.

VF definition policy 208 can be any suitable data or policy used to define elements relating to VF 214 such as, e.g., weights assigned to particular issues and so forth. Selection policy 210 can be any suitable data or policy used to select some subgroup of microservices 108 for chaos testing such as, e.g., a VF 214 threshold, a number of microservices 108 to be selected, or the like. Additional examples of VF definition policy 208 and selection policy 210 are further detailed below.

As noted above, it can be important to apply chaos testing only to the most vulnerable parts of a software system (e.g., the most vulnerable microservices 108). However, determining the most vulnerable subset of microservices 108 for chaos testing can be complicated for numerous reasons. For example, there can be hundreds or even thousands of the microservices from which to select, so the prioritization for chaos testing selection should be done among them based on their vulnerability. But the question of how such vulnerability can be defined and pinned down mathematically arises. This difficulty is further increased because the actual vulnerability changes dynamically over time as associated microservices 108 code is being developed. Therefore, the vulnerability criteria should be dynamically applied for the selection of the microservices and evolve with the solution.

In accordance with the disclosed techniques, in order to properly define a most suitable subset of the microservices 108 that will undergo chaos testing, we will try to find the services that are most vulnerable within the system. One general observation that can be made is that a given microservice 108 is more vulnerable when its codebase is complex and when the developers, who contribute to that codebase, have tendency to produce code with high severity issues, which is further discussed with reference to FIG. 3

Figure 3:
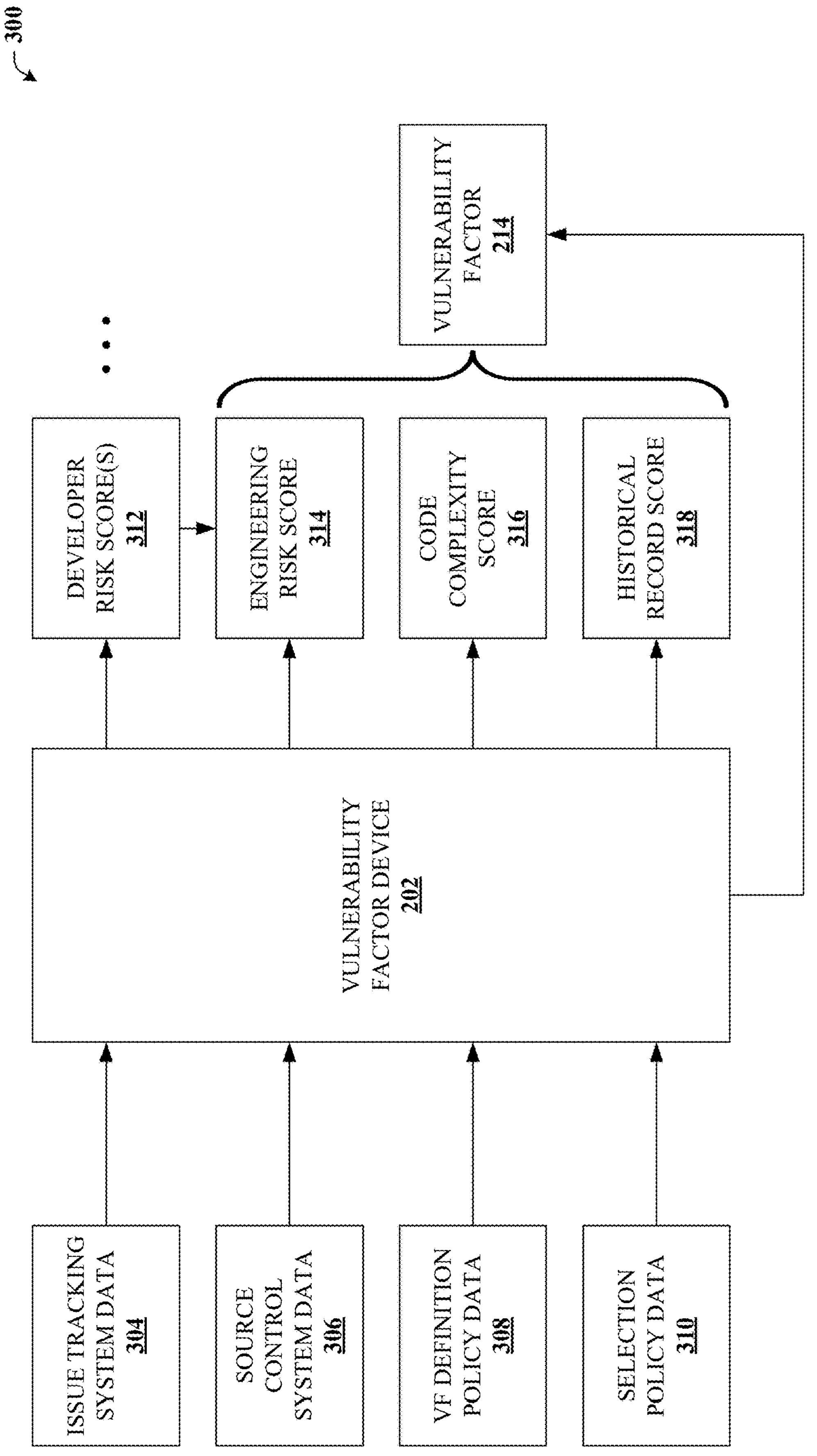
FIG. 3 depicts an example schematic block diagram illustrating example techniques used by the vulnerability factor device for calculating a vulnerability factor in accordance with certain embodiments of this disclosure.

While still referring to FIG. 2, but turning now as well to FIG. 3, an example schematic block diagram 300 is depicted illustrating example techniques used by the vulnerability factor device 202 for calculating a vulnerability factor 214 in accordance with certain embodiments of this disclosure. As illustrated VF device 202 can receive as inputs issue tracking system data 304 (e.g., from issue tracking system 204), source control system data 306 (e.g., from source control system 206), VF definition policy data 308 (e.g., from VF definition policy 208), selection policy data 310 (e.g., from selection policy 210), and any other suitable data.

By using these data 304-310, VF device 202 can determine a VF 214 for a given microservice 108. As illustrated, VF 214 can itself be a function of several different risk scores or metrics. To further explain and in some embodiments, the disclosed solution can be essentially divided into five parts. The first three parts can be indicative of various different risk scores, namely, a first risk score that factors in engineering risk score (ERS) 314, indicative of a determined risk associated with engineers and/or developers who contributed to the associated microservice's codebase; a code complexity score (CCS) 316 indicative of a determined risk associated with the current complexity of the microservice's code; and a historical record score (HRS) 318 indicative of a historical record of issues associated with the microservice and/or a developing entity of the microservice.

As a fourth part of the solution, all or a portion of these three risk metrics, ERS 314, CCS 316, and HRS 318 can be individually weighted to determine a VF 214 for each microservice 108 of microservice platform 106. In some embodiments, only a subset of the three risk metrics can be used, so that one or more metric is not used and/or one or more of these three metrics can have a weight set to zero.

As shown in FIG. 2, once VFs 214 have been determined for microservices 108, then the microservices can be ranked or ordered appropriately. In this example, a high VF 214 represents a higher vulnerability, whereas a low VF 214 can represent a lower vulnerability. Thus, a given microservice 108 associated with VF $\mathbf{214}_1$, has a VF of 76, which is determined to be the most vulnerable of all microservices and is therefore likely to be selected for chaos testing. Another microservice 108 associated with VF 214N, has a VF of 1, representing a very low vulnerability and therefore the associated microservice is not likely to be selected for chaos testing.

As a fifth part of the solution, vulnerability data (e.g., see vulnerability data 620 of FIG. 6) can be determined, representing the subset of microservices 108 that are to undergo chaos testing. In other words, vulnerability data can represent identifiers of the most vulnerable microservices 108, which can be selected according to VF 214 scores and in accordance with selection policy data 310 such as, e.g., the top 10% of microservices 108 having the highest VF 214, some X number of microservices 108 having the highest VF 214, all microservices 108 having a VF 214 above a defined threshold, and so on. It is understood that VFs 214 could be calculated in a different manner such that a lower VF 214 represented a higher vulnerability and any such permutation relating to specific calculations or results of VF 214 are considered to be within the scope of this disclosure.

Still referring to FIG. 3, to provide further detail with respect to a determination of VF 214, VF device 202 can, in some embodiments, determine ERS 314. As an example, initially, VF device 202 can receive issue tracking system data 304 (e.g., from Jira or another suitable issue tracking system) and determine a number of defects or issues that have been previously been identified for a particular developer that has contributed to the microservice 108 that is currently being examined. In other words, certain previous contributions of any developer that has contributed to the microservice being examined can be audited for a list of previous issues.

Each issue that is identified can be assigned a severity weight, which can be a configurable value for each type of issue that occurred in the past with code provided by the developer being examined. In some embodiments, the severity weight can be determined by a system administrator or another appropriate entity and can be indicated by VF definition policy data 308. Such can result in a developer risk score (DRS) 312 for each developer that has contributed to the microservice 108 being examined.

In some embodiments, DRS 312 can be summed over severity weights multiplied by an amount of the relevant defects with the associated severity which has been assigned to that particular defect. Thus, a total DRS 312 can be determined as a sum of each individual DRSs 312 and the total DRS 312 can be applied to ERS 314. By way of example, ERS 314 can be normalized to a numeric value between zero (0) and one (1) and can be equal to a DRS 312 per developer divided by a total development risk score in a system.

Although the severity of the defects that were raised to the developer can be a major metric and can be sufficient for a determination of ERS 314, in order not to lose the generality, the disclosed techniques can also be able to work with additional metrics in order to provide even more fine-tuned result. To achieve that, the weight-based calculation can be applied where each metric can be normalized to fit a [0-1] range and a specific weight in range between 0 and 100 can be associated therewith. Hence, a final ERS 314 can then be a weighted sum of all the participating metrics divided by 100, which can result in a numeric value between 0 and 1. A non-exhaustive list of metrics that can be combined to generate ERS 314 can be found at FIG. 4A.

Figure 4A:
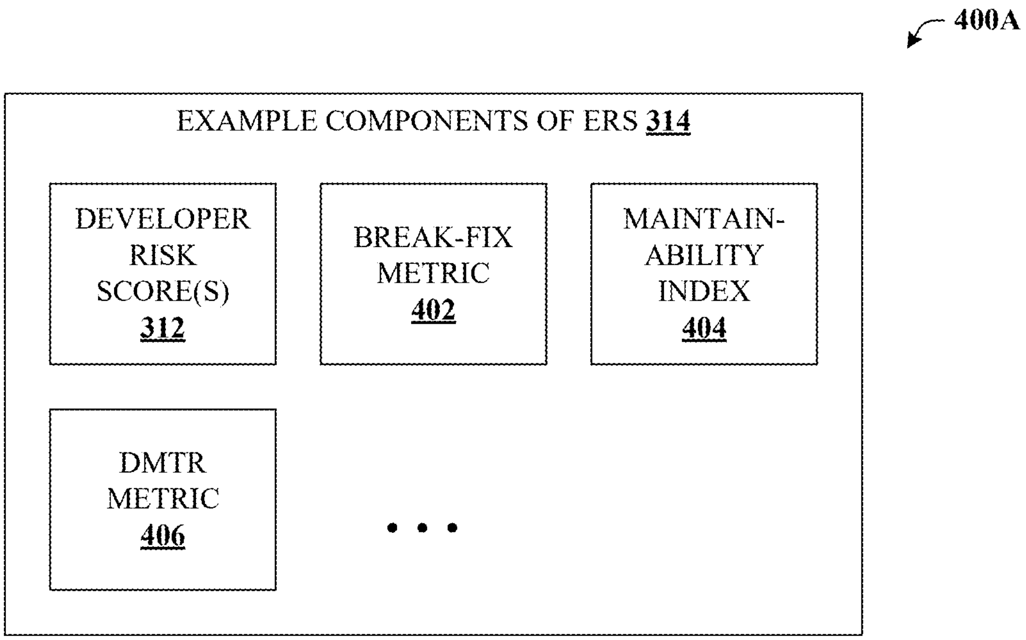
FIG. 4A depicts a schematic block diagram illustrating example components of the engineering risk score in accordance with certain embodiments of this disclosure.

With reference now to FIG. 4A, a schematic block diagram 400A is depicted illustrating example components of ERS 314 in accordance with certain embodiments of this disclosure. As has already been described, ERS 314 can comprise DRS 312, which can be an aggregation from multiple different individual DRSs 312 for each developer that contributed to the codebase of the microservice being examined.

In some embodiments, ERS 314 can further comprise break-fix metric 402. Break-fix metric 402 can relate to a measure of the frequency and efficiency of resolving defects or errors in a software system. Such can include an average time to resolve a reported issue or bug (e.g., a mean time to repair metric), the percentage of issues resolved on the first attempt (e.g., a first fix rate metric), the percentage of issues resolved within a specified timeframe such as 24 hours or the like (e.g., a resolution rate metric), the number of bugs or defects per unit of code or functionality (e.g., a bug density metric), or the percentage of issues that require additional attempts or escalations in order to resolve (e.g., a defect escalation rate metric). Any such metric detailed above or otherwise herein can be normalized, weighted, or combined with ERS 314 in an appropriate manner.

In some embodiments, ERS 314 can include maintainability index 404. Maintainability index 404 can be a software metric that seeks to quantify the relative ease of maintaining and understanding a software system. For example, maintainability index 404 can represent a numerical score that indicates the software's maintainability, generally with higher values indicating a (better) higher maintainability and lower values indicating (worse) lower maintainability. Thus, an inverse function of maintainability index 404 can be combined with ERS 314, potentially normalizing and appropriately weighting in cases where a better ERS 314 is lower and a worse ERS 314 is higher.

In some embodiments, ERS 314 can include a defect mean time to resolution (DMTR) metric 406. DMTR metric 406 can be indicative of any suitable metric that tracks resolution of known defects not already indicated as part of break-fix metric 402.

Still referring to FIG. 3, in some embodiments, VF device 202 can determine CCS 316, which can also be a factor of VF 214. As with ERS 314, CCS 316 can also be a metric that is normalized to fit the [0-1] range. CCS 316 can also be an aggregate of many different metrics, including a Halstead volumes metric and/or a maintainability index that can be the same or different than maintainability index 404. CCS 316 can be determined in response to receiving source control system data 306, e.g., from GitHub or another suitable source control system.

The Halstead volumes metric can be any suitable measure of code size and complexity. The maintainability index metric can be substantially similar to that described above with reference to maintainability index 404. In addition, CCS 316 can include other suitable indicators of code complexity, which is further exemplified at FIG. 4B.

Figure 4B:
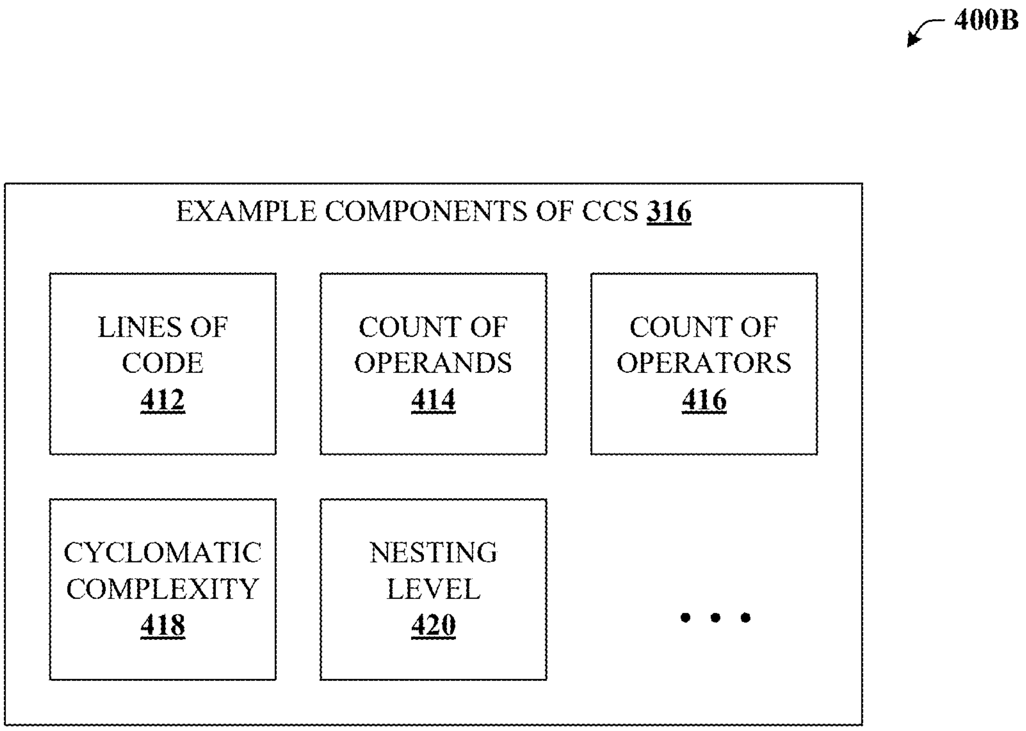
FIG. 4B depicts a schematic block diagram illustrating example components of the code complexity score in accordance with certain embodiments of this disclosure.

Referring now to FIG. 4B, a schematic block diagram 400B is depicted illustrating example components of CCS 316 in accordance with certain embodiments of this disclosure. In that regard, CCS 316 can comprise a metric derived from a count of lines of code 412. In some embodiments, CCS 316 can comprise a metric derived from a count of operands 414 within the code of the microservice 108. In some embodiments, CCS 316 can comprise a metric derived from a count of operators 416 within the code of microservice 108.

Furthermore, CCS 316 can comprise a metric relating to cyclomatic complexity 418. Cyclomatic complexity 418 can represent a measure of control flow complexity within the code of microservice 108. Further still, CCS 316 can comprise a metric relating to a nesting level 420 of inheritance or any other suitable code complexity metric such as a measure of code documentation (e.g., percentage of comments) or the like.

Still referring to FIG. 3, in some embodiments, VF device 202 can determine HRC 318, which can also be used to determine VF 214. Although ERS 314 and CC 316 metrics provide a good insight into vulnerability of the microservice 108 being examined, HRC 318 can be used to catch more marginal cases that may not be caught by the initial two metrics previously described. For example, high turnover of developers who contribute to the code repository or unclear requirements for development may exist for some development entities. If such situations are relevant to a certain microservices, one can see those otherwise hidden issues reflected in the HRS 318 metric.

As noted previously, VF definition policy can be defined by a system administrator that provides a numeric value (e.g., severity weight) for each defect type. For each microservice 108, the defects related to it along with associated severities can be identified by cross-referencing issue tracking system data 304 and source control system data 306.

A total microservices risk score in a system can be summed over individual microservices'risk scores. This total microservices risk score can be normalized as a numeric value between zero and one and can be equal to the risk score per microservice divided by the total microservices'risk score in the system. Although the severity of defects that were fixed in a microservice can be a major metric for the calculation of HRS 318, similar to a pluggable mechanism for additional metrics that were described in connection with ERS 314, here HRS 318 can also support additional metrics. A non-exhaustive list of examples of those additional metrics that can be used with HRS 318 can include: a code aging metric, a code coverage metric, a number of commits metric, a number of developers metric, and so forth.

The code aging metric can relate to a measure of a degradation of software quality and reliability over time due to the accumulation of defects, errors, or inconsistencies in the codebase. The code coverage metric can relate to a measure used to express the percentage of source code executed during a test suite run. The number of commits metric can relate to a count of changes made to a repository. The number of developers metric can relate to a number of different developers that contributed to a particular software element or the like.

Once all or a portion of ERS 314, CCS 316, and HRS 318 have been determined by VF device 202, VF 214 can be determined. As noted, VF 214 can allow platform operators to rate individual microservices according to vulnerability, which can then be used to identify selection for chaos testing. In some embodiments, VF 214 can be determined from any combination of ERS 314, CCS 316, and HRS 318. For instance, VF definition policy data 308 can indicate certain weights for each one of ERS 314, CCS 316, and HRS 318, for example a weight (WF) ranging from 0 to 100 such that when combined, VF 214 can be determined as WF1*ERS 314+WF2*CCS 316+WF3*HRS 318.

Hence, in this embodiment, VF 214 for any given microservice 108 can be a numeric value between 0 and 100, as illustrated at reference numeral 212 of FIG. 2 that orders a microservices 108 cluster by VF 214. It is further noted that once ranked and ordered in terms of vulnerability, selection policy data 310 can be used to determined the specific subgroup or subset of microservices 108 that are selected for chaos testing (e.g., the top 20 highest VF 214 values, top 5% of VF 214 values, any value greater than a threshold VF 214 value, . . . ).

Figure 5:
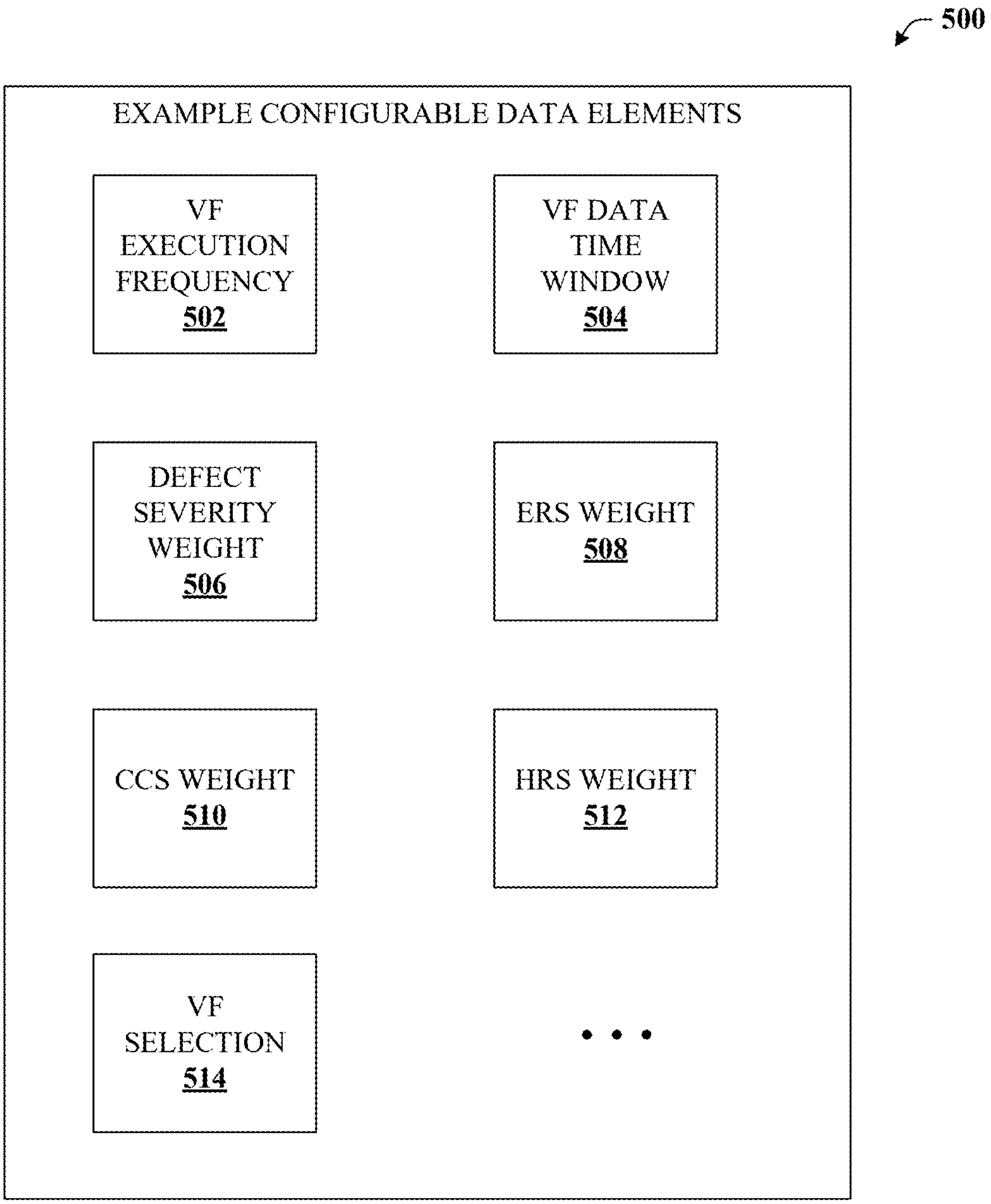
FIG. 5 depicts a schematic block diagram illustrating various example configurable data elements that can be adjusted to improve chaos testing processes in accordance with certain embodiments of this disclosure.

Therefore, it can be observed that many elements can be configurable (e.g., by a system operator) to be suitably tailored for many different implementations. FIG. 5 depicts a schematic block diagram 500 illustrating various example configurable data elements that can be adjusted to improve chaos testing processes in accordance with certain embodiments of this disclosure.

For example, VF device 202 can periodically calculate VF 214 for all or a portion of microservices 108 deployed on microservices platform 106. The frequency (e.g., VF execution frequency 502) and time period (e.g., VF data time window 504) that will be used for VF 214 calculation can each be configurable data elements selected by a system operator or the like. For instance, VF execution frequency

502 may indicate that the all or a portion of VFs 214 are to be recalculated once per week. Thus, a given VF 214 value can evolve over time as the underlying code for an associated microservice 108 evolves. VF data time window 504 can indicate that data used (e.g., issue tracking system data 304, source control system data 306, . . . ) can go back, say, three months. Thus, DRS 312, ERS 314, CCS 316, and HRS 318 can all evolve as developers gain more experience, code becomes more complex, and defects are discovered or fall out of the time window.

As has already been discussed, ERS weight 508 can represent a configurable weight (e.g., 50) to apply to ERS 314, CCS weight 510 can represent a configurable weight (e.g., 30) to apply to CCS 316, HRS weight 512 can represent a configurable weight (e.g., 20) to apply to HRS 318, and VF selection 514 can represent a configurable selection policy of which or how many microservices 108 having the highest (or otherwise most vulnerable) VF 214 scores.

Figure 6:
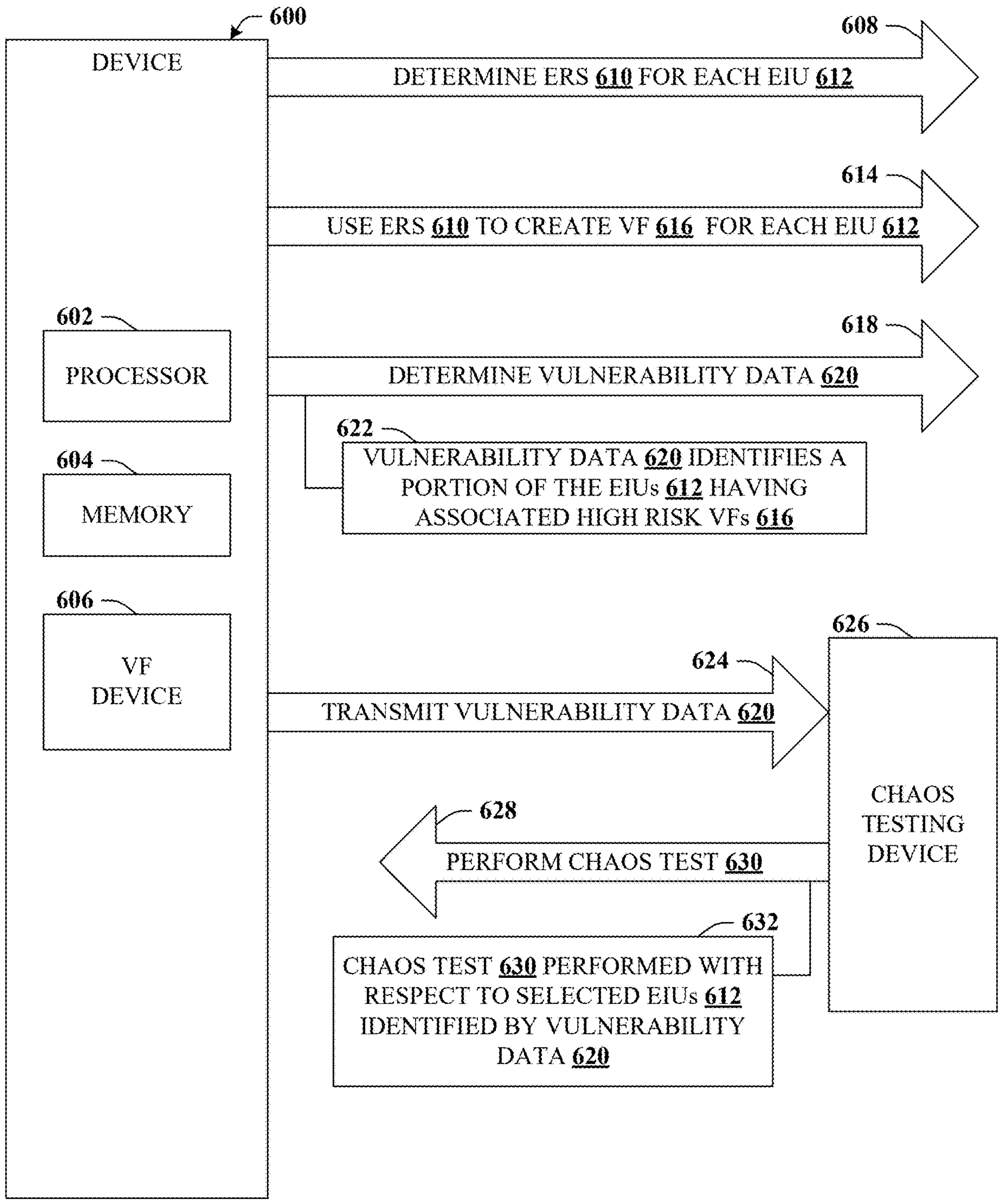
FIG. 6 depicts a schematic block diagram illustrating an example device that can determine a vulnerability factor for microservices of a microservices platform to be used with chaos testing prioritization in accordance with certain embodiments of this disclosure.

With reference now to FIG. 6, a schematic block diagram illustrating an example device 600 that can determine a vulnerability factor for microservices of a microservices platform to be used with chaos testing prioritization in accordance with certain embodiments of this disclosure. In some embodiments, device 600 can be included in or communicatively coupled to a microservices platform such as microservices platform 106. In some embodiments, device 600 can include all or a portion of the elements detailed in connection with FIGS. 2 and 3. For example, in the illustrated embodiment, device 600 comprises VF device 606, which can be substantially similar to VF device 202.

Device 600 can comprise a processor 602 that, potentially along with VF device 606, can be specifically configured to perform functions associated with determining a vulnerability of a microservice (or other executable instruction unit) of a microservices platform (or other software system platform). Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or VF device 606. Along with these special-purpose instructions, processor 602 and/or VF device 606 can be a special-purpose device. Further examples of the memory 604 and processor 602 can be found with reference to FIG. 11. It is to be appreciated that device 600 or computer 1102 can represent a server device or a client device of a network or data services platform and computer 1102 can be used in connection with implementing one or more of the systems, devices, or components shown and described in connection with FIG. 6 and other figures disclosed herein.

At reference numeral 608, device 600 can determine an ERS 610 (e.g., ERS 314) for each executable instruction unit (EIU 612) of some software system platform. As has been detailed above, EIU 612 can be a microservice (e.g., microservice 108 of microservices platform 106), but in other embodiments, can be any suitable executable instruction unit such as a module, an application, a software component, a computational process, and so on. ERS 610 can be determined as a function of a number of source code defects and an assigned weight of the source code defects that are associated with a developer of the microservice. Thus, ERS 610 can represent an aggregate risk for all developer(s) who contributed to the code of the associated EIU 612.

At reference numeral 614, device 600 can use ERS 610 to create VF 616 (e.g., VF 214) for each EIU 612. In other words, ERS 610 can be determined by combining respective developer risk scores (e.g., DRS 312) and, in turn, ERS 610 can represent a component of VF 616. In some embodiments, VF 616 can comprise other components as well (e.g., detailed in connection with FIG. 7), but in this example, VF 616 is at least a function of ERS 610.

At reference numeral 618, device 600 can determine vulnerability data 620. Vulnerability data 620 can be representative of a subgroup or subset of EIUs 612 from among all EIUs 612 of the software system or platform. In other words, as indicated at reference numeral 622, vulnerability data 620 can identify a portion of the EIUs 612 having associated high risk VFs 616.

At reference numeral 624, device 600 can transmit vulnerability data 620 to chaos testing device 626. As described vulnerability data 620 (e.g., a list or other identification of some X most vulnerable EIUs 612) can be usable by chaos testing device 626 to structure a chaos testing procedure. For example, as indicated at reference numeral 628, chaos testing device 626 can perform chaos test 630 structured in a manner to target EIUs 612 that are identified by vulnerability data 620 to be the most vulnerable, as illustrated at reference numeral 632.

Figure 7:
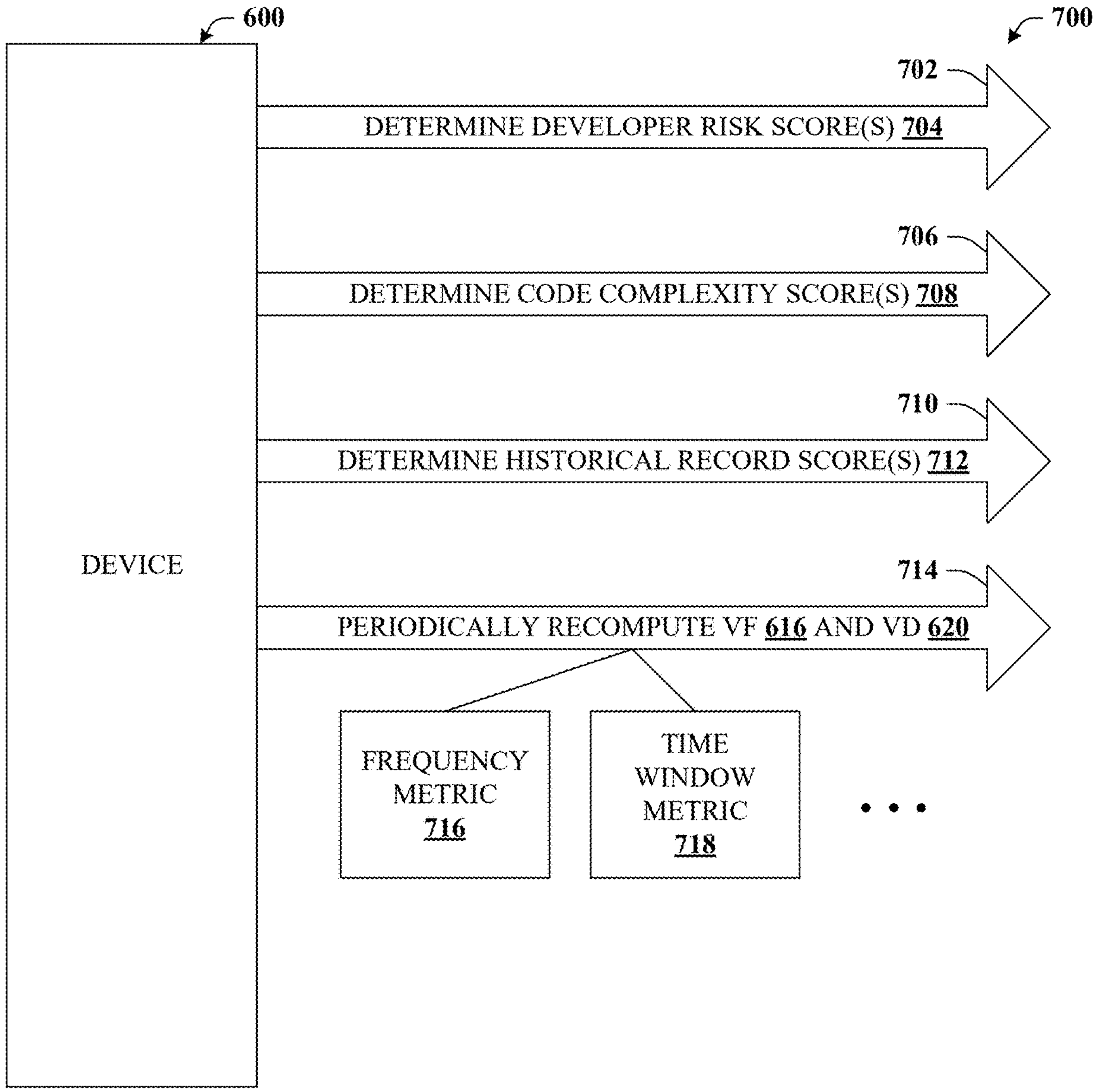
FIG. 7 depicts a schematic block diagram illustrating the example device that can provide additional functionality or elements relating to determining a vulnerability factor for microservices of a microservices platform to be used with chaos testing prioritization in accordance with certain embodiments of this disclosure.

Turning now to FIG. 7, depicted is a schematic block diagram illustrating the example device 600 that can provide additional aspects or elements relating to determining a vulnerability factor for microservices of a microservices platform to be used with chaos testing prioritization in accordance with certain embodiments of this disclosure.

For example, at reference numeral 702, device 600 can determine DRS 704 (e.g., DRS 312). As detailed above, DRS 704 can represent a risk or vulnerability relating to an individual developer who contributed to the codebase of the associated EIU 612. All DRSs 704 for all (or some portion) of developers who contributed to the codebase can be aggregated into ERS 610, which can then be used by device 600 to construct VF 616.

Furthermore, at reference numeral 706, device 600 can determine code complexity score 708 (e.g., CCS 316) that can be indicative of a potential vulnerability due to a complexity of the underlying code of a given EIU 612. Similarly, at reference numeral 710, device 600 can determine historical record score 712 (e.g., HRS 318) that can be indicative of a potential vulnerability due to potential issues that may not be examined by ERS 610 or the like such as, e.g., high turnover rates for developers, low experienced developers, unspecified requirements by an associated developer entity, and so on. In some embodiments, CCS 706 and HRS 712 can be combined with ERS 610 to generate VF 616.

At reference numeral 714, device 600 can periodically recomputed VF 616 and vulnerability data 620. Such recalculation can be based on configurable metrics such as a frequency metric 716 (e.g., VF execution frequency 502) that indicates how often to perform the re-computation, and time window metric 718 (e.g., VF data time window 504) that determines how far back in the codebase history defects or other relevant data elements are to be examined.

EXAMPLE METHODS

Figure 8:
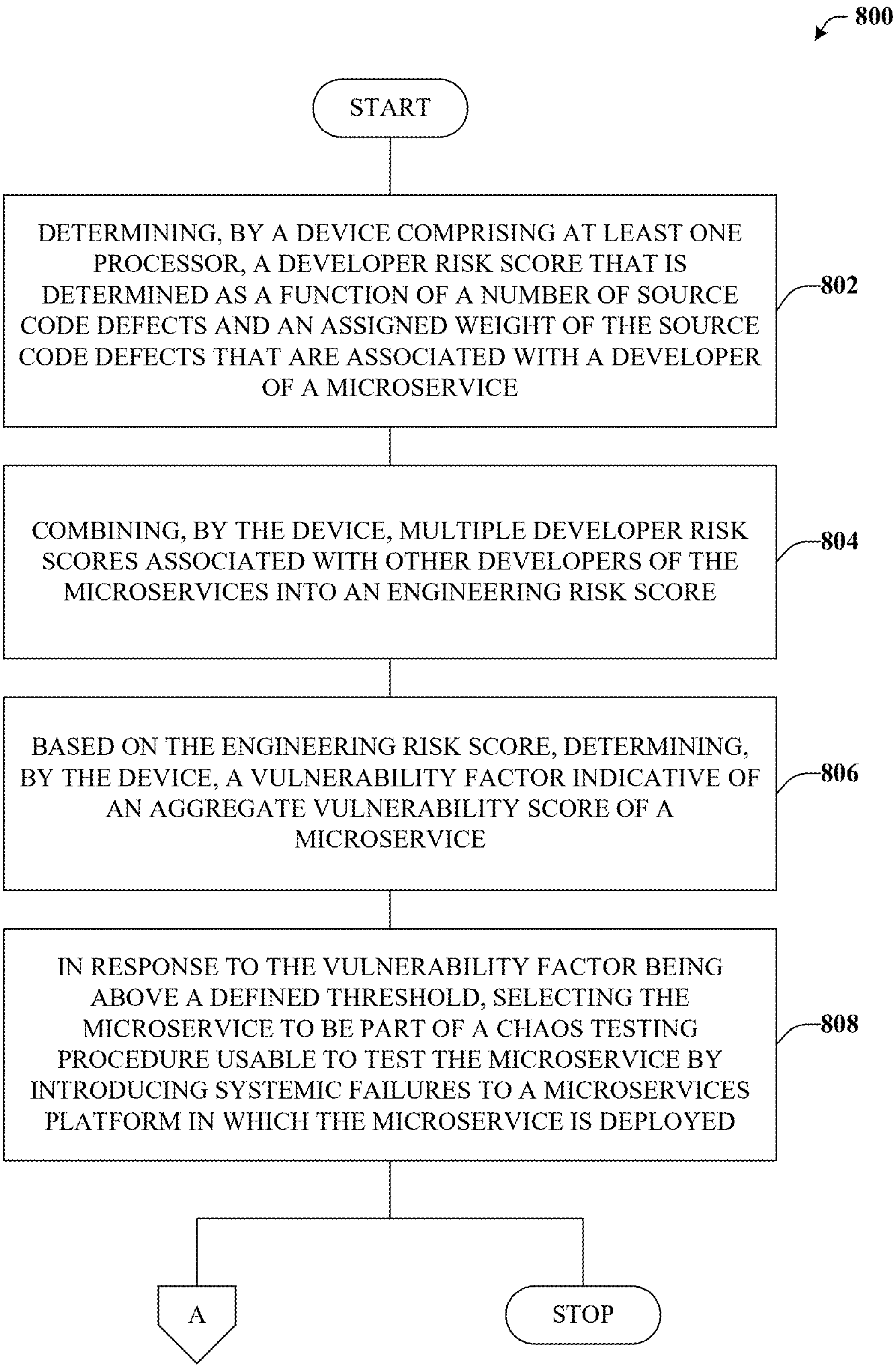
FIG. 8 illustrates an example method that can determine a vulnerability factor for microservices of a microservices platform to be used with chaos testing prioritization in accordance with certain embodiments of this disclosure.
Figure 9:
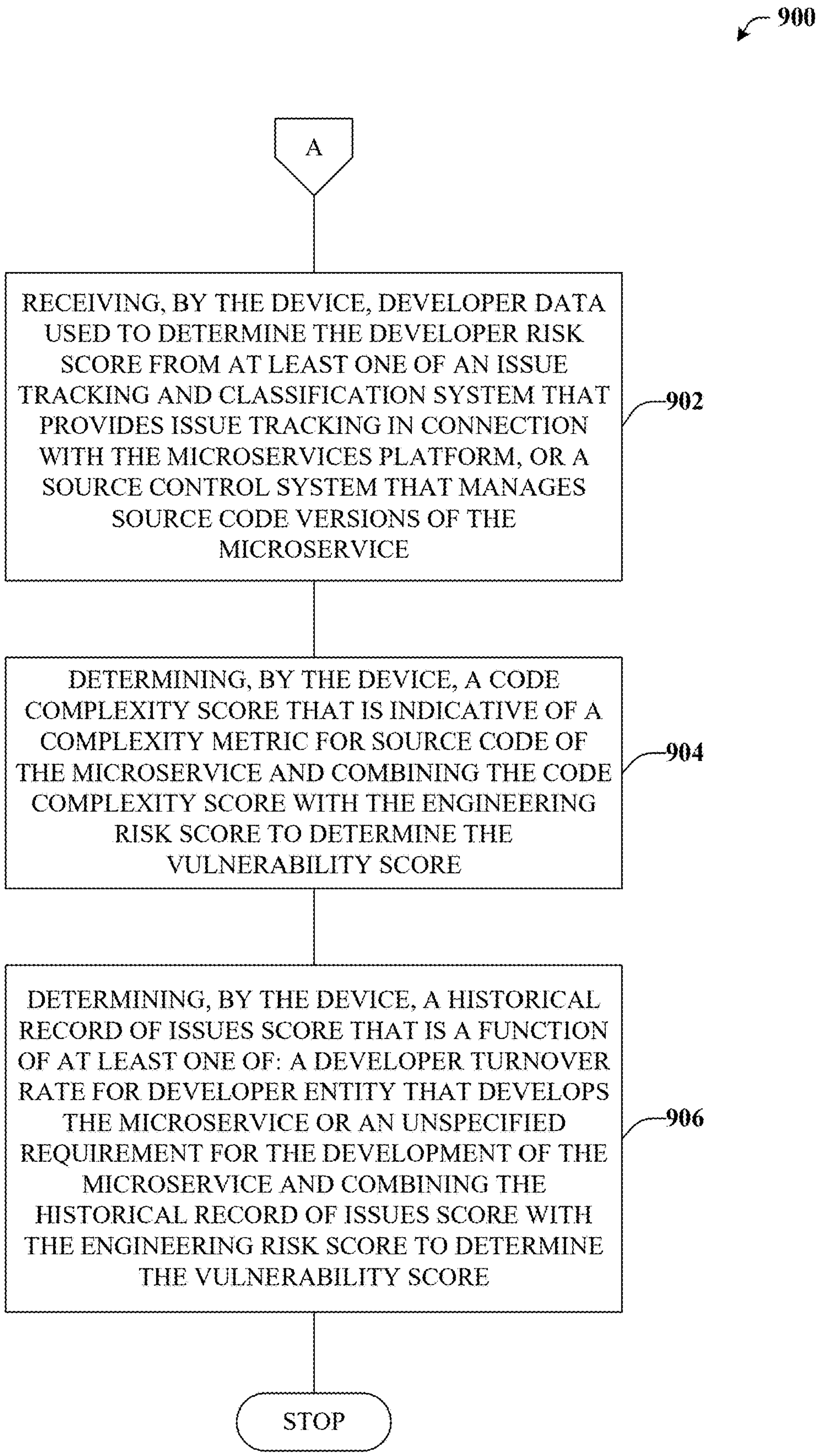
FIG. 9 illustrates an example method that can provide for additional functionality or elements relating to determining a vulnerability factor for microservices of a microservices platform to be used with chaos testing prioritization in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 8, exemplary method 800 is depicted. Method 800 can determine a vulnerability factor for microservices of a microservices platform to be used with chaos testing prioritization in accordance with certain embodiments of this disclosure. While method 800 describes a complete method, in some embodiments, method 800 can include one or more elements of method 900, reached via insert A, as discussed at FIG. 9.

At reference numeral 802, a device comprising at least one processor can determine a developer risk score. The developer risk score can be determined as a function of a number of source code defects and an assigned weight of the source code defects that are associated with a developer of a microservice.

At reference numeral 804, the device can combine multiple developer risk scores associated with other developers of the microservices into an engineering risk score.

At reference numeral 806, based at least on the engineering risk score, the device can determine a vulnerability factor indicative of an aggregate vulnerability score of a microservice.

At reference numeral 808, in response to the vulnerability factor being above a defined threshold, the device can select the microservice to be part of a chaos testing procedure usable to test the microservice by introducing systemic failures to a microservices platform in which the microservice is deployed. Method 800 can terminate in some embodiments, or proceed to insert A in other embodiments, which is further detailed in connection with FIG. 9.

Turning now to FIG. 9, exemplary method 900 is depicted. Method 900 can provide for additional functionality or elements relating to determining a vulnerability factor for microservices of a microservices platform to be used with chaos testing prioritization in accordance with certain embodiments of this disclosure.

For example, at reference numeral 902, the device introduced in FIG. 9 can further receive developer data. Developer data can be used to determine the developer risk score from at least one of an issue tracking and classification system that provides issue tracking in connection with the microservices platform, or a source control system that manages source code versions of the microservice.

A reference numeral 904, the device can determine a code complexity score. The code complexity score can be indicative of a complexity metric for source code of the microservice. The device can further combine the code complexity score with the engineering risk score to determine the vulnerability score.

At reference numeral 906, the device can determine a historical record of issues score. The historical record of issues score can be a function of at least one of: a developer turnover rate for developer entity that develops the microservice or an unspecified requirement for the development of the microservice. The device can further combine the historical record of issues score with the engineering risk score (and potentially with the code complexity score) in order to determine the vulnerability score.

Example Operating Environments

Figure 10:
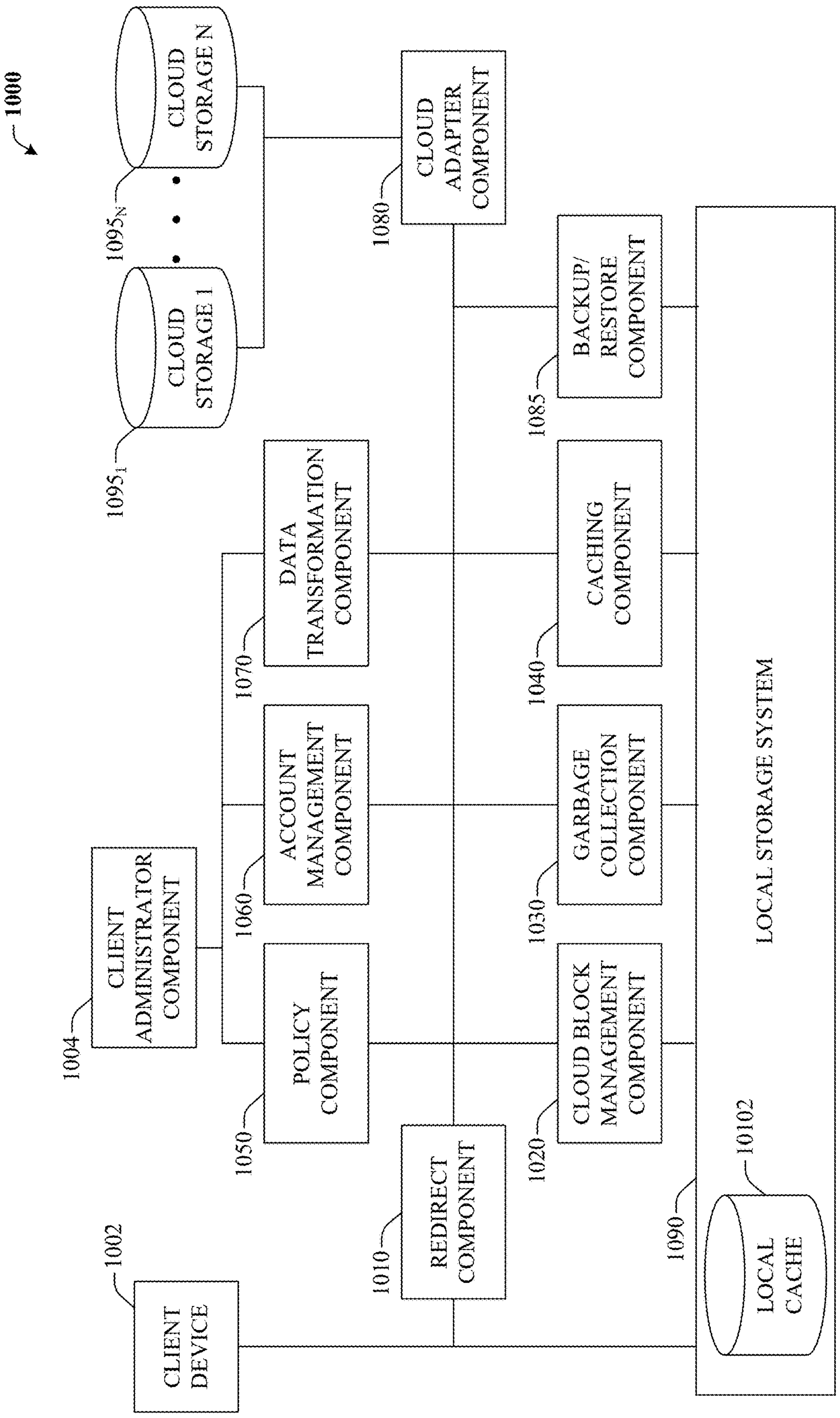
FIG. 10 illustrates a block diagram of an example distributed file storage system that employs tiered cloud storage in accordance with certain embodiments of this disclosure.
Figure 11:
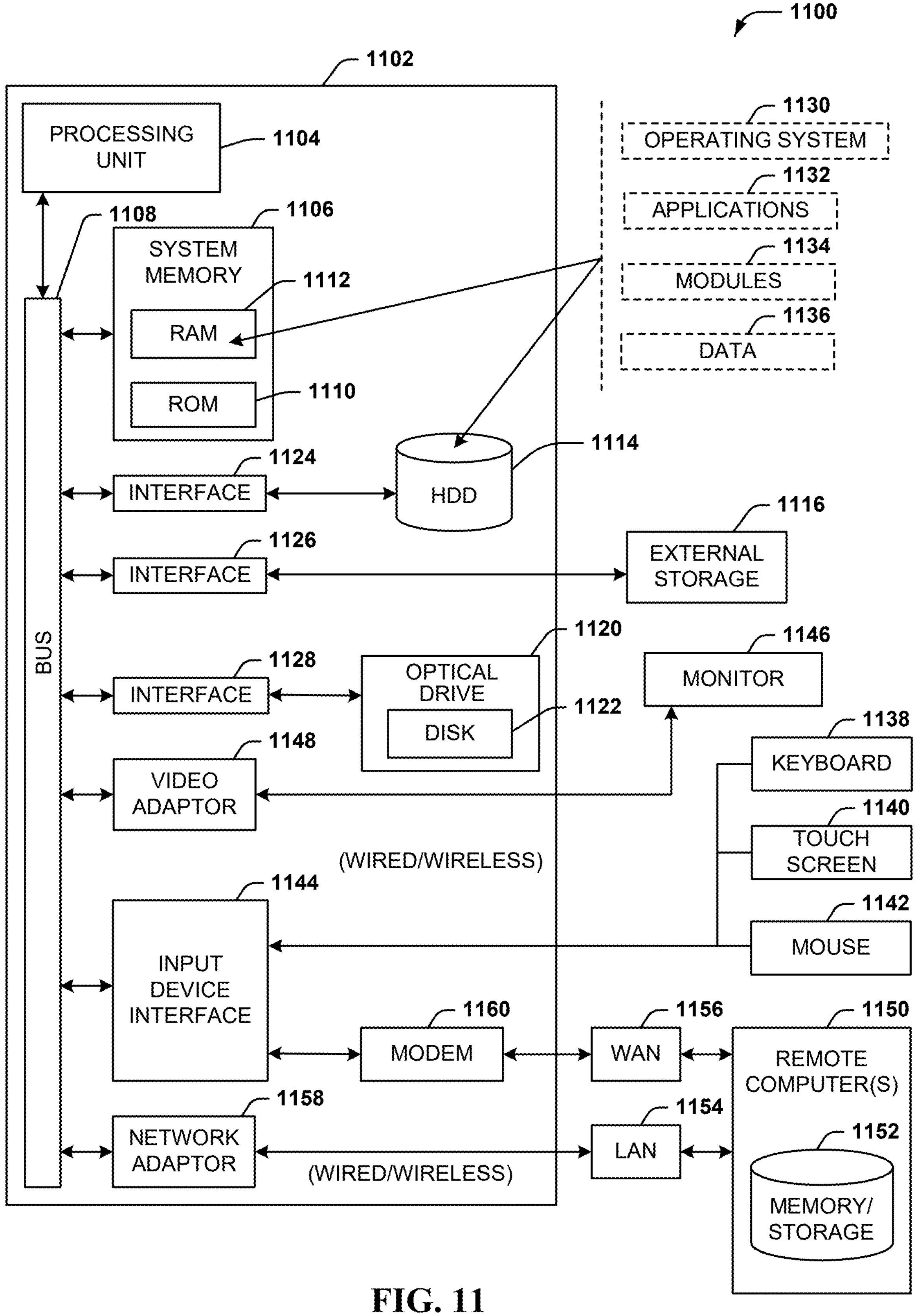
FIG. 11 illustrates an example block diagram of a computer operable to execute certain embodiments of this disclosure.

To provide further context for various example embodiments of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with example embodiments described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $\mathbf{1095}_1$ and cloud storage N $\mathbf{1095}_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on a list of mappings that the cloud block management component 1020 manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various example embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:

at least one processor; and at least one memory that stores executable instructions that, when executed by the at least one processor, facilitate performance of operations, comprising:

determining respective vulnerability factors for respective microservices of a first group of microservices deployed on a microservices platform, wherein a vulnerability factor of the respective vulnerability factors represents an aggregate vulnerability score of a microservice of the first group and comprises an engineering risk score that is determined as a function of a number of source code defects and an assigned weight of the source code defects that are associated with a developer of the microservice, wherein the vulnerability factor further comprises a code complexity score that is determined based on a nesting level of inheritance metric associated with a source code of the first group of microservices and a source code documentation metric representing a percentage value of comments included in the source code, wherein the determining of the respective vulnerability factors for the respective microservices comprises determining the respective vulnerability factors for the respective microservices based on a configurable time window that indicates a maximum age of the source code defects that are to be examined in connection with the respective vulnerability factors;

determining vulnerability data representative of a second group of microservices comprising a subgroup of the first group of microservices with associated vulnerability factors of the respective vulnerability factors being above a defined threshold; and transmitting the vulnerability data to a chaos testing device or service, the vulnerability data being usable, by the chaos testing device or service, to cause random systematic failures in the microservices platform in order to test selected microservices identified by the second group.

2. The device of claim 1, wherein the engineering risk score represents an aggregate developer score comprising respective developer scores for each developer of the microservice.

3. The device of claim 2, wherein the operations further comprise determining a developer score of the respective developer scores in response to a first query to an issue tracking and classification system that provides issue tracking in connection with the microservices platform, or in response to a second query to a source control system that manages source code versions.

4. The device of claim 2, wherein the engineering risk score further comprises at least one of: a break-fix metric indicative of a count of break-fixes associated with the developer or the microservice, a maintainability index metric indicative of a maintainability of the microservice or other microservices to which the developer contributed, or a defect mean time to resolution metric indicative of a mean time to resolve issues associated with the developer or the microservice.

5. The device of claim 1, wherein the code complexity score is indicative of a complexity metric for the source code of the microservice.

6. The device of claim 5, wherein the complexity metric is a function of at least one of: a first number of lines of code of the source code, a second number of operands in the source code, a third number of operators in the source code, or a cyclomatic complexity indicative of linearly independent code paths of the source code.

7. The device of claim 1, wherein the vulnerability factor further comprises a historical record of issues score associated with the microservice.

8. The device of claim 7, wherein the historical record of issues score is a developer turnover rate for a developer entity that develops the microservice.

9. The device of claim 1, wherein the determining of the respective vulnerability factors for the respective microservices comprises determining the respective vulnerability factors for the respective microservices periodically based on a configurable frequency value that indicates a frequency with which to recalculate the respective vulnerability factors.

10. The device of claim 1, wherein the assigned weight of the source code defects and respective weights assigned to the engineering risk score, the code complexity score, or a historical record of issues score are configurable.

11. A device, comprising:

at least one processor; and at least one memory that stores executable instructions that, when executed by the at least one processor, facilitate performance of operations, comprising:

determining respective vulnerability factors for respective executable instruction units of a first group of executable instruction units deployed on a software platform, wherein a vulnerability factor of the respective vulnerability factors represents an aggregate vulnerability score of an executable instruction unit of the first group and comprises an engineering risk score that is determined as a function of a number of source code defects and an assigned weight of the source code defects that are associated with a developer identity of a developer of the executable instruction unit, wherein the vulnerability factor further comprises a code complexity score that is determined based on a nesting level of inheritance metric associated with a source code of the executable instruction unit and a documentation metric representing a percentage value of comments included in the executable instruction unit, wherein the determining of the respective vulnerability factors for the respective executable instruction units comprises determining the respective vulnerability factors for the respective executable instruction units based on a configurable time window that indicates a maximum age of the source code defects that are to be examined in connection with the respective vulnerability factors;

determining vulnerability data representing a second group of executable instruction units comprising a portion of the first group with associated vulnerability factors of the respective vulnerability factors being above a defined threshold; and transmitting the vulnerability data to a chaos testing device or service configured to perform a chaos testing procedure with respect to usage of the second group of executable instruction units via the software platform.

12. The device of claim 11, wherein the executable instruction unit is at least one of a microservice, a module, an application, a software component, or a computational process.

13. The device of claim 11, wherein the engineering risk score represents an aggregate developer score comprising respective developer scores for each developer identity of each developer of the executable instruction unit.

14. The device of claim 13, wherein the operations further comprise determining a developer score of the respective developer scores in response to a first query to an issue tracking and classification system that provides issue tracking in connection with the software platform, or in response to a second query to a source control system that manages source code versions.

15. The device of claim 14, wherein the vulnerability factor further comprises at least one of:

the code complexity score that is determined based on a complexity metric for the source code of the executable instruction unit; or a historical record of issues score associated with the executable instruction unit that is determined based on a turnover rate among developers of a development entity of the executable instruction unit.

16. A method, comprising:

determining, by a device comprising at least one processor, respective vulnerability factors for respective microservices of a first group of microservices deployed on a microservices platform, wherein a vulnerability factor of the respective vulnerability factors represents an aggregate vulnerability score of a microservice of the first group and comprises a developer risk score that is determined as a function of a number of source code defects and an assigned weight of the source code defects that are associated with a developer of the microservice, wherein the vulnerability factor further comprises a code complexity score that is determined based on a nesting level of inheritance metric associated with source code of the first group of microservices and a source code documentation metric representing a percentage value of comments included in the source code, and wherein the determining of the respective vulnerability factors for the respective microservices comprises determining the respective vulnerability factors for the respective microservices based on a configurable time window that indicates a maximum age of the source code defects that are to be examined in connection with the respective vulnerability factors;

determining, by the device, vulnerability data representative of a second group of microservices comprising a subgroup of the first group of microservices with associated vulnerability factors of the respective vulnerability factors being above a defined threshold; and transmitting, by the device, the vulnerability data to a chaos testing device or service, the vulnerability data being usable, by the chaos testing device or service, to cause random systematic failures in the microservices platform in order to test selected microservices identified by the second group.

17. The method of claim 16, further comprising receiving, by the device, developer data used to determine the developer risk score from at least one of an issue tracking and classification system that provides issue tracking in connection with the microservices platform, or a source control system that manages source code versions of the microservice.

18. The method of claim 17, further comprising determining, by the device, the code complexity score that is indicative of a complexity metric for the source code of the microservice and combining the code complexity score with the developer risk score to determine the vulnerability factor.

19. The method of claim 18, further comprising:

determining, by the device, a historical record of issues score that is a function of a developer turnover rate for a developer entity that develops the microservice; and combining, by the device, the historical record of issues score with the developer risk score to determine the vulnerability factor.

20. The method of claim 18, further comprising:

determining, by the device, a historical record of issues score that is a function of an unspecified requirement for the development of the microservice; and combining, by the device, the historical record of issues score with the developer risk score to determine the vulnerability factor.

* * * * *